United States Patent
Reimann

(10) Patent No.: US 7,223,830 B2
(45) Date of Patent: May 29, 2007

(54) METHOD AND DEVICE FOR THE PRODUCTION OF POLYTRIMETHYLENE TEREPHTHALATE

(75) Inventor: Randolf Reimann, Alzenau (DE)

(73) Assignee: Zimmer AG, Frankfurt am Main (DE)

( * ) Notice: Subject to any disclaimer, the term of this patent is extended or adjusted under 35 U.S.C. 154(b) by 11 days.

(21) Appl. No.: 10/477,792

(22) PCT Filed: Apr. 16, 2002

(86) PCT No.: PCT/EP02/04181

§ 371 (c)(1),
(2), (4) Date: May 18, 2004

(87) PCT Pub. No.: WO02/100920

PCT Pub. Date: Dec. 19, 2002

(65) Prior Publication Data

US 2004/0186264 A1    Sep. 23, 2004

(30) Foreign Application Priority Data

May 25, 2001 (DE) .................. 101 25 677

(51) Int. Cl.
*C08G 63/00* (2006.01)
*C08G 63/02* (2006.01)

(52) U.S. Cl. ....................... 528/272; 528/271

(58) Field of Classification Search .............. 528/279, 528/401, 503, 271, 272
See application file for complete search history.

(56) References Cited

U.S. PATENT DOCUMENTS

| 3,127,377 | A | * | 3/1964 | Lindenauer | .................. 526/60 |
| 5,259,931 | A | | 11/1993 | Fox | |
| 5,459,229 | A | | 10/1995 | Kelsey et al. | |
| 5,599,900 | A | * | 2/1997 | Bhatia | ........................ 528/491 |
| 6,512,080 | B2 | * | 1/2003 | Kelsey et al. | ................ 528/279 |

FOREIGN PATENT DOCUMENTS

WO    WO 98/49216    11/1998
WO    WO 00 44809 A    8/2000

OTHER PUBLICATIONS

PTT Polytrimethylene Terephthalate Process, brochure of mg engineering, Lurgi Zimmer AG, Apr. 1999.

* cited by examiner

*Primary Examiner*—Taylor Victor Oh
(74) *Attorney, Agent, or Firm*—Norris McLaughlin & Marcus PA

(57) ABSTRACT

In a process for producing polytrimethylene terephthalate by esterification of terephthalic acid with 1,3-propanediol and polycondensation, the vapors formed are rectified, the liquid phase is recirculated to the process, and the lower-boiling components are condensed. To obtain an almost completely stripped condensate, the condensate is circulated and stripped with air and the exhaust air is subjected to a catalytic oxidation.

7 Claims, 1 Drawing Sheet

METHOD AND DEVICE FOR THE PRODUCTION OF POLYTRIMETHYLENE TEREPHTHALATE

This is a 371 of PCT/EP02/104181 filed 16 Apr. 2002 (international filing date).

This invention relates to a process and an apparatus for the continuous production of polytrimethylene terephthalate (PTT), in which pure terephthalic acid (PTA) is esterified with 1,3-propanediol (PDO), thereafter prepolycondensated and subsequently polycondensated, the vapors formed thereby are rectified and the liquid phase substantially consisting of PDO is recirculated to the production process and the vapor phase containing the lower-boiling components water, acrolein, allyl alcohol, 1,3-propanediol, 1-butanol, 1-propanol, hydroxypropanol and acetic acid is condensed.

BACKGROUND OF THE INVENTION

In the company brochure PTT 01 P65/04.99 of Lurgi Zimmer AG it is provided to charge a paste consisting of pure PTA and PDO together with a special catalyst into a first reaction pressure stage for esterification. The vapors formed in the esterification and containing PDO, water, acrolein, allyl alcohol, 1-butanol, lpropanol, hydroxypropanol and acetic acid are rectified, the PDO obtained as bottom product being recirculated to the esterification stage and the lower-boiling components being discharged as top product and condensed. An aliquot of the vapor condensate formed is recirculated to the rectification and only the excess aliquot is discharged and subsequently purified. In a second reaction pressure stage, the polymer esterified for 90 to 95% is converted completely and then charged to a first and subsequently to a second prepolycondensation stage, in which low-molecular PTT is formed and PDO is separated. In the subsequent polycondensation stage, PTT is brought to the desired molecular weight. The lower-boiling components obtained in the two condensation stages, preferably acrolein and allyl alcohol, are rectified together with the vapors from the esterification.

From EP-A-0 812 337 it is known to mix the condensed top-product obtained during the rectification of vapors from the production of PTT along with further acrolein-containing waste-waters with a base in a tank, in order to reduce the content of free toxic acrolein. After this treatment, the liquid can be supplied to an aerobic-biological waste water processing. It is particularly disadvantageous that in this process the amounts of acrolein, allyl alcohol, etc. contained therein are not reduced by the addition of alkaline compounds, so that large amounts of "bound" acrolein, free allyl alcohol, etc. are discharged to the biological waste water purification, which results in the production of corresponding amounts of biological excess sludge. Furthermore, toxic effects of the allyl alcohol on the microorganisms in the waster water purification cannot be excluded. Moreover, the exhaust air streams obtained during the production of PTT according to this process are discharged to the atmosphere unpurified.

SUMMARY OF THE INVENTION

It is the object of the present invention to develop the above-described process of producing PTT such that the initial loading with organic pollutants of the condensate formed during the rectification of the vapors is stripped to a residual loading such that the condensate will less load a biological processing and a toxic effect can largely be excluded.

This object is solved in that the circulating vapor condensate is stripped with air and part of the stripped condensate is discharged. By stripping the vapor condensate with air, the initial loading thereof with organic pollutants, in particular acrolein and allyl alcohol, is reduced to such an extent that the biological waste water processing is loaded less and the risk of toxic effects of the allyl alcohol on the microorganisms is minimized. By circulating the vapor condensate to be stripped it is achieved that the variations in the concentration of the organic pollutants in the condensate itself and thus also in the exhaust air of the stripping process are evened out.

By recirculating the stripped condensate to the rectification, the separation efficiency of the rectification with respect to PDO is improved considerably.

Stripping the vapor condensate is expediently performed at temperatures from 55 to 75° C.

DETAILED DESCRIPTION

In accordance with the preferred aspect of the process of the invention, the exhaust air of the stripping process, which has a high loading in particular of acrolein and allyl alcohol, is oxidized catalytically and then discharged to the atmosphere. Moreover, it is provided to catalytically oxidize exhaust air streams, which originate from the process and are loaded in particular with acrolein and allyl alcohol, together with the exhaust air of the stripping process. The advantages of the catalytic oxidation of the exhaust air streams loaded in particular with acrolein and allyl alcohol consist in extremely short exhaust air supply lines, in relatively low operating temperatures, and in the maintenance of usually prescribed emission limit values.

The apparatus for the catalytic oxidation of the exhaust air substantially laden with acrolein and allyl alcohol, comprises a heat exchanger, in which the exhaust air having a temperature of 55 to 75° C. is heated to a temperature of 280 to 320° C., and a reactor including a catalyst, in which reactor the organic pollutants contained in the exhaust air are oxidized for more than 99% to obtain carbon dioxide and water.

BRIEF DESCRIPTION OF THE DRAWINGS

The process in accordance with the invention is represented in the drawing by way of example as a flow diagram and will subsequently be explained in detail.

Through line (1), the vapor condensate of the stripping column (3) having a plurality of packed beds (2), which has been withdrawn at the head of a rectification column not represented here, is supplied to the upper part of said stripping column. For expelling the dissolved pollutant components contained in the vapor condensate, stripping air is blown into the lower part of the stripping column (3) through line (4) by means of the blower (5) and guided countercurrently with respect to the vapor condensate. The stripped vapor condensate is withdrawn at the bottom of the stripping column (3) and again charged to the upper part of the stripping column (3) through line (6) by means of the liquid pump (7). By means of the heat exchanger (8) disposed in line (6), the temperature of the circulating stripped vapor condensate is adjusted to the desired value. An aliquot of the stripped vapor condensate is withdrawn from line (6) through line (9) and supplied to the rectification column as reflux. Furthermore, excess stripped vapor condensate is discharged from line (6) through line (10) and upon flowing through the cooler (11) supplied to a further treatment. Smaller exhaust air streams obtained in the plant for producing PTT are combined and through line (12) added to the stripper air flowing in line (4). The exhaust air streams of vacuum pumps and of the condenser of the rectification column are sucked in by means of the blower (13) and through line (14) combined with the exhaust air of the stripping column flowing in line (15). This exhaust air containing organic pollutants, in particular acrolein and allyl alcohol, and having a temperature of about-70° C. is supplied to a heat exchanger (18) by adding fresh air blown in through line (16) by means of the blower (17) and is heated to a temperature of about 300° C. Upon flowing through a start-up heater (19), the laden exhaust air is supplied to the oxidation plant (20), in which the organic pollutants contained in the exhaust air are oxidized for more than 99% to obtain carbon dioxide and water. Through line (21), the purified exhaust air having an average temperature of 500° C. leaves the oxidation plant (20), flows through the heat exchanger (18), in which the temperature is reduced to 250° C., and is discharged to the atmosphere via the chimney (22). The purified exhaust air only contains trace amounts of carbon dioxide and nitrogen oxides.

EMBODIMENT

Figure 1:
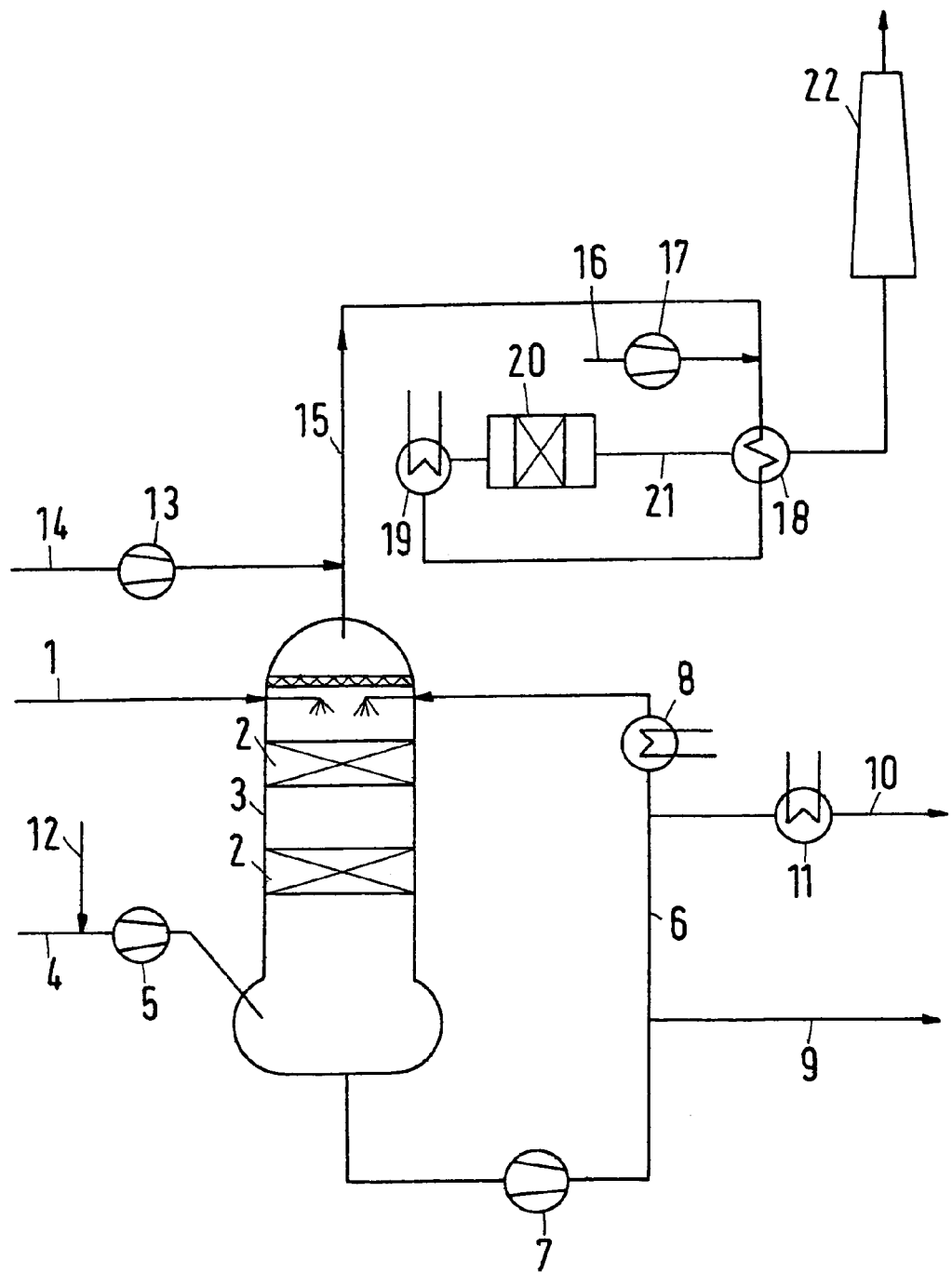

From the rectification column of a plant for producing 300 t PTT/day, 6.57 m$^3$/h vapor condensate with a temperature of 90° C. flow through line (1) into the stripping column (3). The vapor condensate comprises:

| | |
|---|---|
| 1.52 g/l | acrolein |
| 10.65 g/l | allyl alcohol |
| 3.00 g/l | 1,3-propanediol |
| 1.52 g/l | hydroxypropanol |
| 1.07 g/l | 1-butanol |
| 0.15 g/l | 1-propanol |
| 0.15 g/l | acetic acid, rest water |

Through line (4), about 3000 kg/h fresh air are blown into the stripping column. Through line (15), 3839.5 kg/h total exhaust air with a temperature of 68° C. and containing

| | |
|---|---|
| 3000 kg/h | air |
| 780 kg/h | water |
| 0.20 kg/h | 1,3-propanediol |
| 9.00 kg/h | acrolein |
| 45.00 kg/h | allyl alcohol |
| 1.00 kg/h | hydroxypropanol |
| 3.00 kg/h | 1-butanol |
| 0.80 kg/h | 1-propanol |
| 0.50 kg/h | acetic acid | are discharged. The total exhaust air stream contains 280 kg/h exhaust air originating from other sources and sucked in through line (14), which consists of

| | |
|---|---|
| 6.00 kg/h | acrolein |
| 3.00 kg/h | allyl alcohol |
| 0.30 kg/h | 1,3-propanediol |
| 0.15 kg/h | propene. |

This total exhaust air stream is passed through the oxidation plant (20), in which the organic pollutants contained in the exhaust air are oxidized for more than 99% to obtain carbon dioxide and water, so that the air discharged to the atmosphere only contains 5 mg/Nm$^3$ organic total carbon (TA air≦20 mg/Nm$^3$), 1 mg/Nm$^3$ carbon monoxide (TA air≦100 mg/Nm$^3$) and 2 mg/Nm$^3$ nitrogen oxides (TA air≦200 mg/Nm$^3$). TA air means "Technische Anleitung zur Reinhaltung der Luft" (technical instructions for the prevention of air pollution) and constitutes an administrative regulation of the "Bundesimmissionsschutzgesetz" (Federal Immission Protection Act) in the version of Feb. 27, 1986, in which emission and immission limit values are specified. A comparison of the emission values shows that the emissions contained in the exhaust air of the plant for producing PTT distinctly lie below the specified emission limit values.

1.5 m$^3$/h of the stripped vapor condensate withdrawn at the bottom of the stripping column (3) are discharged from the plant through line (10) with a temperature of 38° C., and 4.3 m$^3$/h flow back as reflux to the rectification column with a temperature of 60° C. The stripped vapor condensate still contains

| | |
|---|---|
| 0.17 g/l | acrolein |
| 4.30 g/l | allyl alcohol |
| 1.55 g/l | hydroxypropanol |
| 3.40 g/l | 1,3-propanediol |
| 0.69 g/l | 1-butanol |
| 0.034 g/l | 1-propanol |
| 0.086 g/l | acetic acid. |

The stripped vapor condensate can be discharged into a biological processing plant for further treatment. Toxic effects are almost excluded.

The invention claimed is:

1. A process for the continuous production of polytrimethylene terephthalate, in which pure terephthalic acid is esterified with 1,3-propanediol, thereafter prepolycondensated and subsequently polycondensated, the vapors formed thereby are rectified to form a liquid phase and a vapor phase, and the liquid phase, consisting of 1,3-propanediol, is recirculated to the production process and the vapor phase, containing the lower-boiling components water, acrolein, allyl alcohol, 1-butanol, 1-propanol, hydroxypropanol and acetic acid is condensed and supplied to a stripping column wherein the condensate is stripped with air, a portion of the stripped condensate is circulated back to the stripping column as reflux, a portion is recirculated to the rectification, and a portion of the stripped condensate is discharged.

2. The process as claimed in claim 1, wherein an aliquot of the stripped vapor condensate is supplied to the rectification as reflux and the excess aliquot of the stripped condensate is supplied to a further treatment.

3. The process as claimed in claim 1, wherein the vapor condensate is stripped at temperatures of 55 to 75° C.

4. The process as claimed in claim 1, wherein the exhaust air of the stripping process, which comprises acrolein and allyl alcohol, is subjected to a catalytic oxidation.

5. The process as claimed in claim 1, wherein exhaust air from the process, which is laden with organic pollutants, is combined with the exhaust air of the stripping process.

6. The process as claimed in claim 1, wherein the reflux of the stripping process is guided concurrently with respect to the inflow of the vapor condensate.

7. The process of claim 5, wherein said organic pollutants comprise acrolein and allyl alcohol.

* * * * *